(12) United States Patent
Kim et al.

(10) Patent No.: US 9,651,030 B2
(45) Date of Patent: May 16, 2017

(54) SOLAR THERMAL POWER GENERATION SYSTEM USING SINGLE HOT MOLTEN SALT THERMAL ENERGY STORAGE TANK

(71) Applicant: KOREA INSTITUTE OF ENERGY RESEARCH, Daejeon (KR)

(72) Inventors: Jong Kyu Kim, Daejeon (KR); Hwan Ki Yoon, Daejeon (KR); Yong Heack Kang, Daejeon (KR); Hong Soo Kim, Daejeon (KR); Sang Nam Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 295 days.

(21) Appl. No.: 14/404,665

(22) PCT Filed: Oct. 31, 2013

(86) PCT No.: PCT/KR2013/009775
§ 371 (c)(1),
(2) Date: Dec. 1, 2014

(87) PCT Pub. No.: WO2015/060490
PCT Pub. Date: Apr. 30, 2015

(65) Prior Publication Data
US 2016/0281689 A1    Sep. 29, 2016

(30) Foreign Application Priority Data
Oct. 31, 2013    (KR) .................. 10-2013-0125678

(51) Int. Cl.
*F24J 2/34*    (2006.01)
*F03G 6/06*    (2006.01)
(Continued)

(52) U.S. Cl.
CPC ............. *F03G 6/065* (2013.01); *F01D 15/10* (2013.01); *F01K 5/00* (2013.01); *F01K 7/16* (2013.01);
(Continued)

(58) Field of Classification Search
CPC ... F24J 2/34; F28D 20/023; F28D 2020/0017; F28D 2020/0047
See application file for complete search history.

(56) References Cited

U.S. PATENT DOCUMENTS 4,362,149 A * 12/1982 Thomson .................. F01K 3/00
126/400
4,993,481 A *  2/1991 Kamimoto .......... C04B 38/0006
126/643
(Continued)

FOREIGN PATENT DOCUMENTS

JP            H 08-14627 A        1/1996

*Primary Examiner* — Jonathan Matthias
(74) *Attorney, Agent, or Firm* — Paratus Law Group, PLLC (57) ABSTRACT

A single thermal energy storage tank is used so that costs can be reduced and an installation space can also be reduced compared to a case where two tanks, i.e., a high temperature tank and a low temperature tank are provided. In addition, the single thermal energy storage tank includes a porous block so that passage of molten salt can be more easily performed and flow pressure drop can be reduced. In addition, the porous block is configured by stacking a plurality of unit blocks so that the capacity of the single thermal energy storage tank can be easily adjusted. Furthermore, a plurality of single thermal energy storage tanks are connected in parallel so that the plurality of single thermal energy storage tanks can be selectively used according to an operation load and thus the solar thermal power generation system can easily cope with the operation load.

14 Claims, 10 Drawing Sheets

(51) Int. Cl.
*F28D 20/00* (2006.01)
*F01D 15/10* (2006.01)
*F01K 7/16* (2006.01)
*F01K 11/02* (2006.01)
*F28C 1/00* (2006.01)
*F01K 5/00* (2006.01)

(52) U.S. Cl.
CPC ............... *F01K 11/02* (2013.01); *F03G 6/06* (2013.01); *F03G 6/067* (2013.01); *F24J 2/34* (2013.01); *F28C 1/00* (2013.01); *F28D 20/0034* (2013.01); *F05D 2220/31* (2013.01); *F28D 2020/0017* (2013.01); *F28D 2020/0047* (2013.01); *Y02E 10/46* (2013.01); *Y02E 60/142* (2013.01); *Y02E 70/30* (2013.01)

(56) References Cited

U.S. PATENT DOCUMENTS

2013/0276774 A1* 10/2013 Simiano ................ F24J 2/34
126/640
2015/0167648 A1* 6/2015 Bergan ................ F24J 2/06
60/641.15

\* cited by examiner

Fig.10

SOLAR THERMAL POWER GENERATION SYSTEM USING SINGLE HOT MOLTEN SALT THERMAL ENERGY STORAGE TANK

CROSS REFERENCE TO PRIOR APPLICATIONS

This application is a National Stage Patent Application of PCT International Patent Application No. PCT/KR2013/009775 (filed on Oct. 31, 2013) under 35 U.S.C. §371, which claims priority to Korean Patent Application No. 10-2013-0125678 (filed on Oct. 22, 2013), which are all hereby incorporated by reference in their entirety.

TECHNICAL FIELD

The present invention relates to a solar thermal power generation system, and more particularly, to a solar thermal power generation system using a single hot molten salt thermal energy storage tank in which solar thermal energy is stored using molten salt and power is generated using the thermal energy stored in the molten salt.

BACKGROUND ART

As environmental pollution occurs due to the exhaustion of chemical energy, such as coal or petroleum, and the usage of the chemical energy, concerns and efforts for the development of alternative energy are on the rise. Thus, the development of a technology for solar thermal power generation using solar energy that is one of alternative energy is required.

A general solar thermal power generation system is a system that concentrates and collects solar energy and converts collected thermal energy into electric energy. The solar thermal power generation system includes a solar collector, a low temperature tank, a high temperature tank, and a steam turbine. When the solar thermal power generation system stores solar heat, molten salt of which temperature rises when molten salt in the low temperature tank passes through the solar collector and absorbs heat, is introduced into the high temperature tank and is stored therein. On the other hand, when the solar thermal power generation system dissipates the solar heat, the molten salt stored in the high temperature tank is heat-exchanged with a heat transfer medium that is circulated in the steam turbine and dissipates heat and then, the molten salt of which temperature is decreased, is again stored in the low temperature tank. Water that is the heat transfer medium that is circulated in the steam turbine, receives heat from the high temperature molten salt and produces steam, thereby operating the steam turbine and generating power.

Japanese Patent Laid-open Publication No. 2008-14627 discloses a solar energy tower system including a low temperature tank and a high temperature tank.

However, the solar thermal power generation system according to the related art requires two tanks and thus, costs increase.

DETAILED DESCRIPTION OF THE INVENTION

Technical Problem

The present invention provides a solar thermal power generation system using a single hot molten salt thermal energy storage tank in which a thermal energy storage capability and liquidity of molten salt can be further improved.

Technical Solution

According to an aspect of the present invention, there is provided a solar thermal power generation system using a single hot molten salt thermal energy storage tank, the solar thermal power generation system including: a solar collector that collects solar heat; a single thermal energy storage tank that is formed in a shape of a porous block so as to form a flow path on which molten salt heated from the solar collector passes and that forms heat of the molten salt as a layer and stores the heat; and a power generator that generates electricity by receiving the heat stored in the single thermal energy storage tank.

According to another aspect of the present invention, there is provided a solar thermal power generation system using a single hot molten salt thermal energy storage tank, the solar thermal power generation system including: a solar collector that collects solar heat; a single thermal energy storage tank in which a plurality of unit blocks are stacked and combined so as to form a flow path on which molten salt heated from the solar collector passes and which forms heat of the molten salt as a layer and stores the heat; a power generator that generates electricity by receiving the heat stored in the single thermal energy storage tank; a high temperature heat storage flow path on which high temperature molten salt heated in the solar collector is guided toward the single thermal energy storage tank; a low temperature heat storage flow path on which low temperature molten salt discharged after heat is stored in the single thermal energy storage tank, is guided toward the solar collector; a heat dissipation flow path which is diverged from the high temperature heat storage flow path and on which heat stored in the single thermal energy storage tank is absorbed and dissipated; and a heat exchanger that heat-exchanges the molten salt on the heat dissipation flow path with a circulation fluid circulated in the power generator.

Effects of the Invention

In a solar thermal power generation system using a single hot molten salt thermal energy storage tank according to the present invention, a single thermal energy storage tank is used so that costs can be reduced and an installation space can also be reduced compared to a case where two tanks, i.e., a high temperature tank and a low temperature tank are provided.

In a solar thermal power generation system using a single hot molten salt thermal energy storage tank according to the present invention, the single thermal energy storage tank includes a porous block so that passage of molten salt can be more easily performed and flow pressure drop can be reduced.

In a solar thermal power generation system using a single hot molten salt thermal energy storage tank according to the present invention, the porous block is configured by stacking a plurality of unit blocks so that the capacity of the single thermal energy storage tank can be easily adjusted.

In a solar thermal power generation system using a single hot molten salt thermal energy storage tank according to the present invention, a plurality of single thermal energy storage tanks are connected in parallel so that the plurality of single thermal energy storage tanks can be selectively used according to an operation load and thus the solar thermal power generation system can easily cope with the operation load.

In a solar thermal power generation system using a single hot molten salt thermal energy storage tank according to the present invention, when the plurality of single thermal energy storage tanks are connected in parallel and used, each single thermal energy storage tank can be made small, and the small single thermal energy storage tank can reduce a time at which the molten salt is stored.

MODE OF THE INVENTION

Hereinafter, a solar thermal power generation system according to an embodiment of the present invention will be described in detail with reference to the accompanying drawings.

Figure 1:
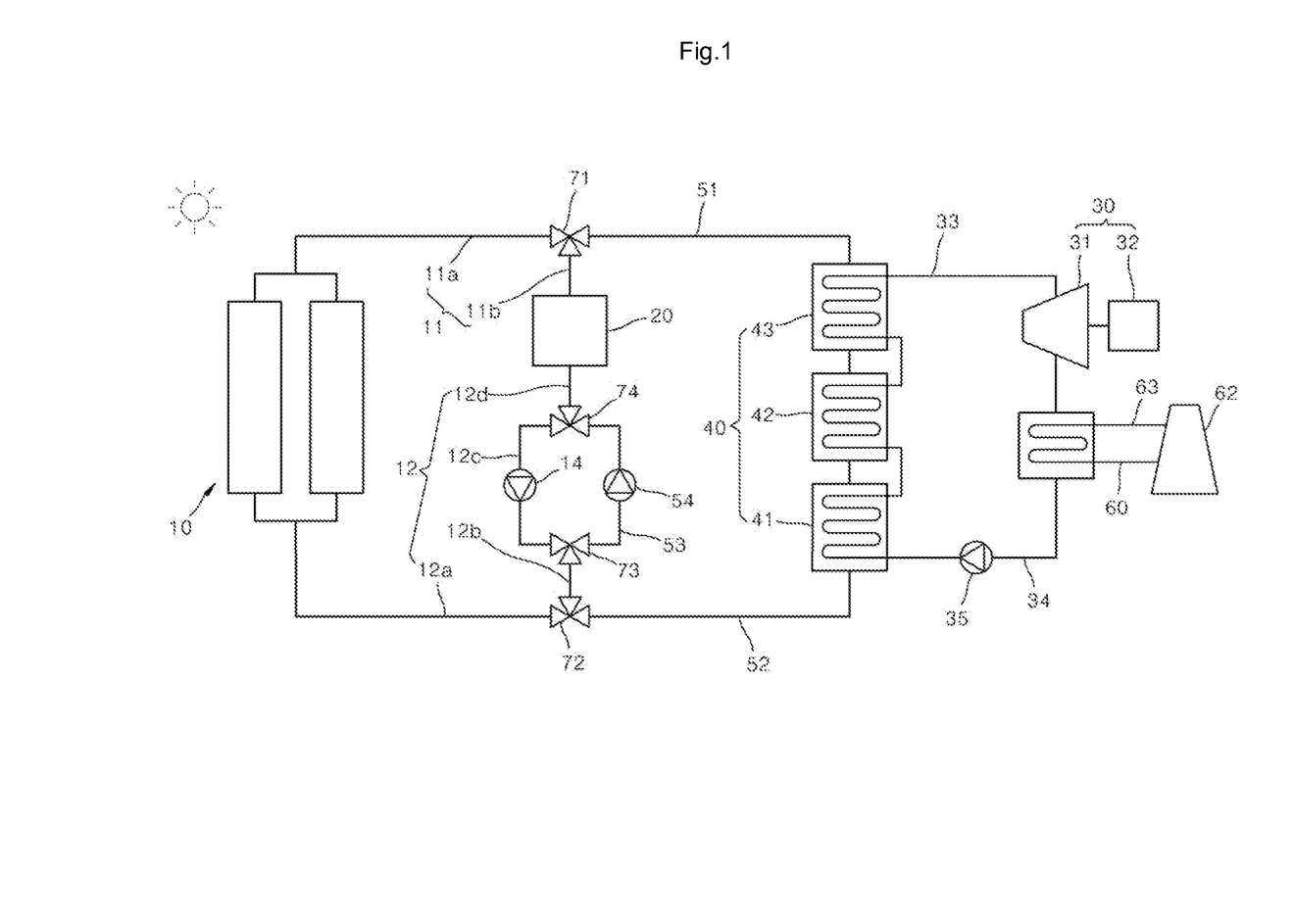
FIG. 1 is a schematic view of a solar thermal power generation system according to an embodiment of the present invention.

FIG. 1 is a schematic view of a configuration of a solar thermal power generation system according to an embodiment of the present invention.

Referring to FIG. 1, the solar thermal power generation system includes a solar collector 10, a single thermal energy storage tank 20, a power generator 30, and a heat-exchanging portion.

The solar collector 10 collects solar heat. The solar collector 10 includes a parabolic-trough or a center-concentrated tower. A plurality of solar collectors 10 may be connected to one another, and in the present embodiment, two solar collectors 10 may be connected to each other.

The single thermal energy storage tank 20 forms heat of the high temperature molten salt as a layer and stores the heat in a state in which an upper portion of the single thermal energy storage tank 20 is in a high temperature state and a lower portion of the single thermal energy storage tank 20 is in a low temperature state while the high temperature molten salt passes through the single thermal energy storage tank 20. The single thermal energy storage tank 20 is formed of a material, such as alumina, silicon carbide (SiC), or concrete so that the molten salt having strong corrosiveness can be used.

The single thermal energy storage tank 20 includes a tank inlet portion 21, a porous block 24, and a tank outlet portion 22.

The tank inlet portion 21 is disposed at an upper portion of the porous block 24. The tank inlet portion 21 is connected to the solar collector 10 on a high temperature heat storage flow path 11 so as to guide introduction of the high temperature molten salt heated in the solar collector 10. An extension portion of which cross section is gradually enlarged, is formed in the tank inlet portion 21 so that the tank inlet portion 21 can be coupled to the porous block 24.

The tank outlet portion 22 is disposed at a lower portion of the porous block 24. The tank outlet portion 24 is connected to the solar collector 10 on a low temperature heat storage flow path 12 on which the low temperature molten salt discharged after heat is stored in the single thermal energy storage tank 20, is guided toward the solar collector 10.

Figure 5:
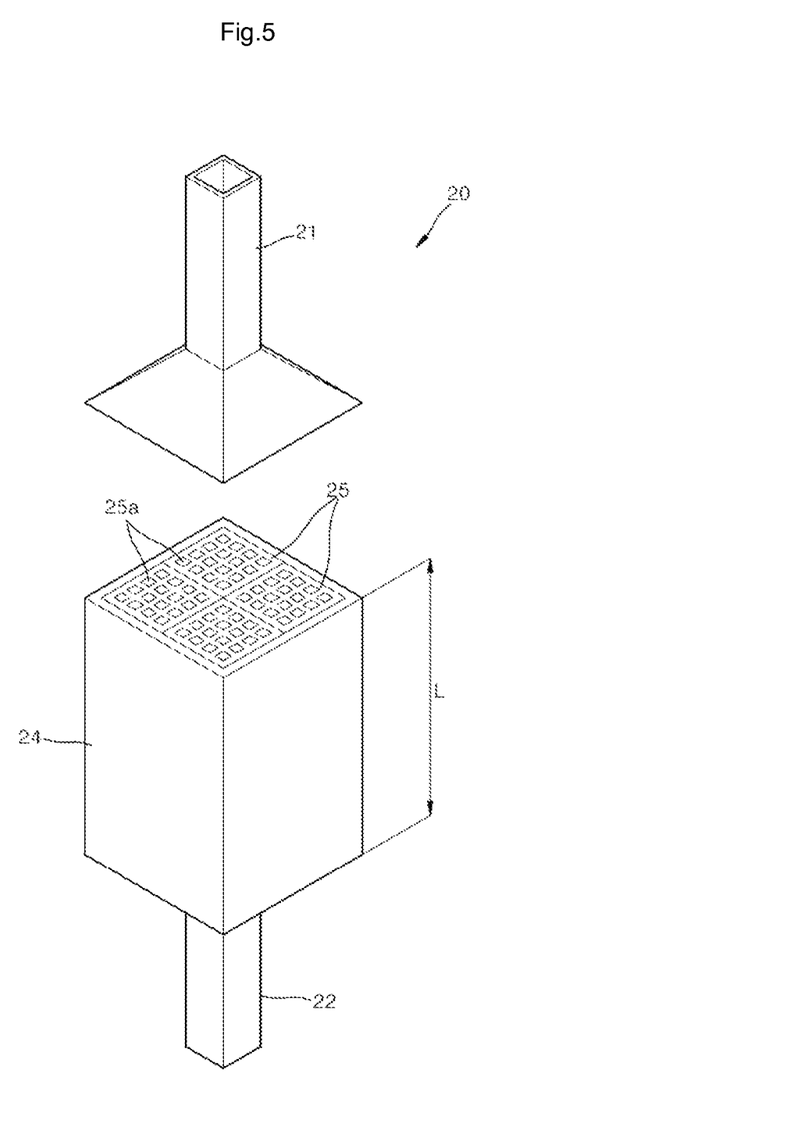
FIG. 5 is an exploded perspective view of the single thermal energy storage tank of FIG. 4.

The porous block 24 constitutes a flow path on which the high temperature molten salt heated from the solar collector 10 passes. The single thermal energy storage tank 20 may include one porous block 24 or one porous block 24 formed by stacking a plurality of unit blocks 25 in a horizontal or vertical direction. In the present embodiment, the plurality of unit blocks 25 are stacked and constitute one porous block.

Figure 6:
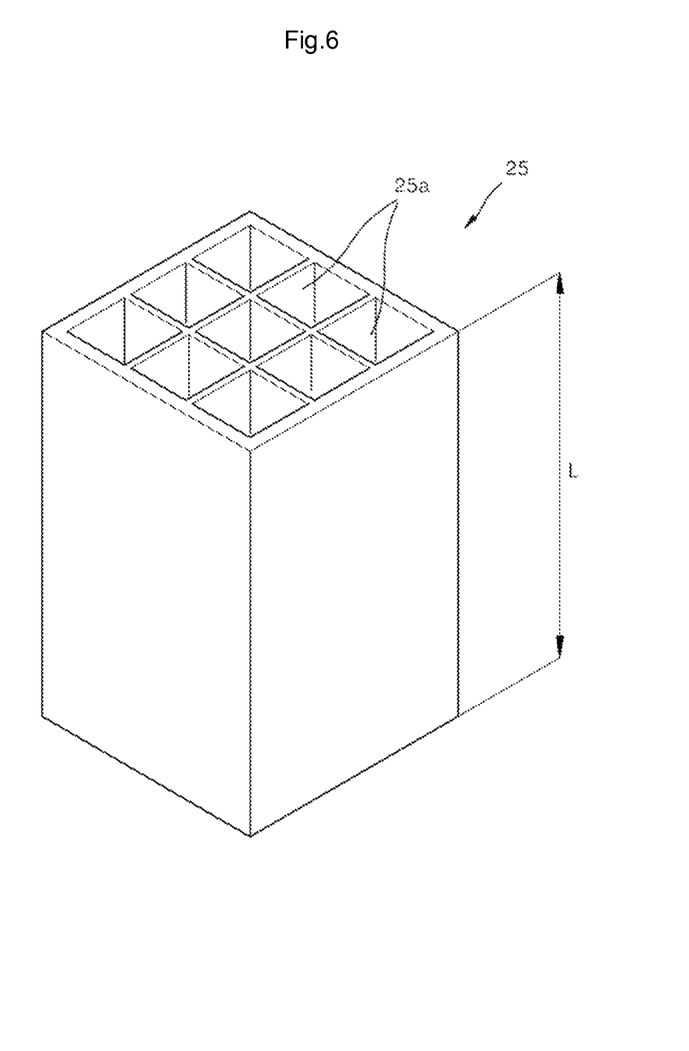
FIG. 6 is a perspective view of unit blocks illustrated in FIG. 5.
Figure 7:
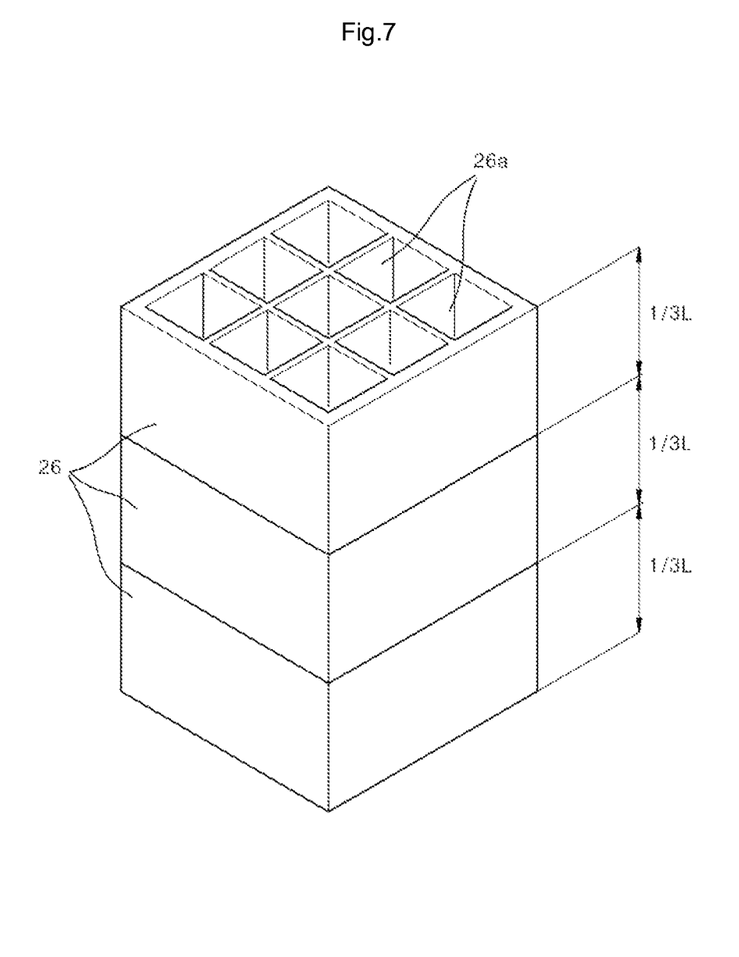
FIG. 7 is a view of another example of the unit blocks of FIG. 5.

Referring to FIG. 6, a length of the unit blocks 25 may be the same as the length L of the porous block 24. Referring to FIG. 7, the plurality of unit blocks 26 may be stacked in the vertical direction and may constitute one porous block 24. When the plurality of unit blocks 26 are stacked in the vertical direction, flow holes 26a of each unit block 26 are coupled to each other so as to be communicate with each other.

Referring to FIG. 5, a plurality of flow holes 25a through which the molten salt passes through the unit block 25, are formed in the unit block 25 to be long in a flow direction. The plurality of flow holes 25 are formed to be spaced apart from each other by a predetermined distance. The plurality of flow holes 25a are formed to be long in the vertical direction that is a flow direction of the molten salt, the occurrence of flow pressure drop of the molten salt within the single thermal energy storage tank 20 can be reduced.

Figure 8:
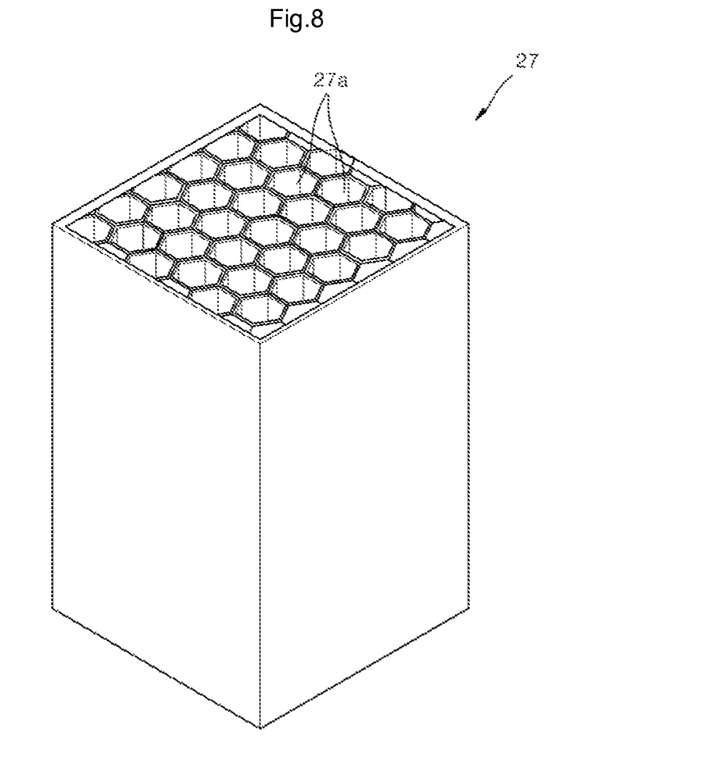
FIG. 8 is a view of still another example of the unit blocks of FIG. 5.
Figure 9:
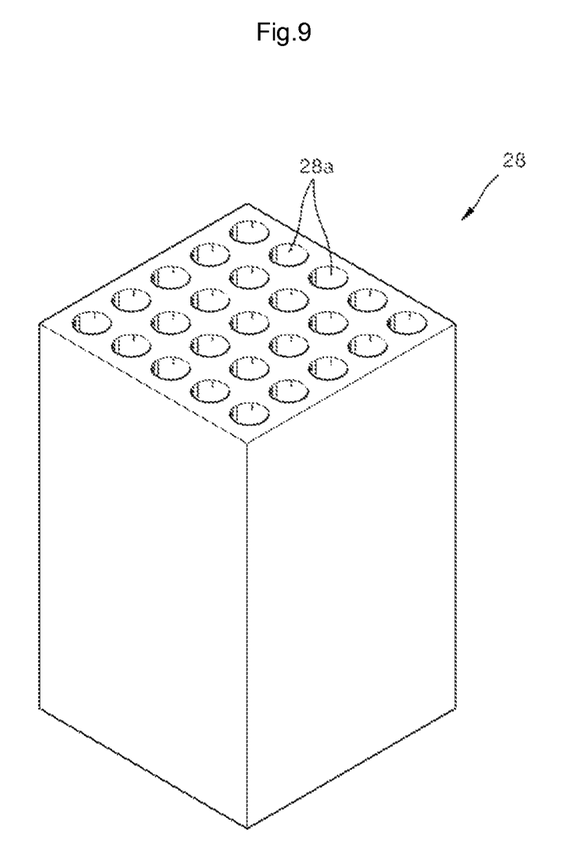
FIG. 9 is a view of still another example of the unit blocks of FIG. 5.

Referring to FIG. 6, cross sections of the flow holes 25a have rectangular shapes. However, aspects of the present invention are not limited thereto. As illustrated in FIG. 8, cross sections of flow holes 27a of a unit block 27 may have hexagonal shapes and thus may have a honeycomb structure. As illustrated in FIG. 9, cross sections of flow holes 28a of a unit block 28 may have circular shapes.

Also, in the present embodiment, the porous block 24 has a rectangular parallelepiped shape. However, the porous block 24 may have a circular or polygonal pillar shape.

On the high temperature heat storage flow path 11, the high temperature molten salt heated in the solar collector 10 is guided toward the single thermal energy storage tank 20 by connecting the solar collector 10 and an upper portion of the single thermal energy storage tank 20. A high temperature heat dissipation flow path 51 that will be described later, is connected to the high temperature heat storage flow path 11. The high temperature heat storage flow path 11 includes a first high temperature heat storage flow path 11a and a second high temperature heat storage flow path 11b, and a first three way valve 71 is installed at a portion in which the first high temperature heat storage flow path 11a, the second high temperature heat storage flow path 11b and a high temperature heat dissipation flow path 51 are connected to one another.

On the low temperature heat storage flow path 12, the low temperature molten salt discharged after heat is stored in the single thermal energy storage tank 20, is guided toward the solar collector 10 again. First and second low temperature heat dissipation flow paths 52 and 53 that will be described later are connected to the low temperature heat storage flow path 12. The low temperature heat storage flow path 12 includes a first low temperature heat storage flow path 12a, a second low temperature heat storage flow path 12b, a third low temperature heat storage flow path 12c, and a fourth low temperature heat storage flow path 12d. The fourth low temperature heat storage flow path 12d is connected to a lower portion of the single thermal energy storage tank 20 and is connected to the third low temperature heat storage flow path 12c and the second low temperature heat dissipation flow path 53 that will be described later, via a fourth three way valve 74. The third low temperature heat storage flow path 12c is connected to the fourth low temperature heat storage flow path 12d, and a heat storage pump 14 that pumps the low temperature molten salt in a direction toward the solar collector 10, is installed on the third low temperature heat storage flow path 12c.

The heat-exchanging portion absorbs heat stored in the single thermal energy storage tank 20 and transfers the absorbed heat to the power generator 30. The heat-exchanging portion includes heat dissipation flow paths 51, 52, and 53, and a heat exchanger 40.

The heat dissipation flow paths 51, 52, and 53 include a high temperature heat dissipation flow path 51, the first low temperature heat dissipation flow path 52, and the second low temperature heat dissipation flow path 53.

The high temperature heat dissipation flow path 51 is connected to the high temperature heat storage flow path 11 and is configured in such a way that the molten salt absorbs the heat formed as a layer and stored in the single thermal energy storage tank 20, is guided toward the heat exchanger 40 on the high temperature heat dissipation flow path 51. The first three way valve 71 is installed at a portion in which the high temperature heat dissipation flow path 51 and the high temperature heat storage flow path 11 are connected to each other.

The first and second low temperature heat dissipation flow paths 52 and 53 are configured in such a way that the molten salt which is heat-exchanged by the heat exchanger 40 and discharged after heat of the molten salt is dissipated, is guided toward the single thermal energy storage tank 20. The first low temperature heat dissipation flow path 52 is connected to a portion in which the first low temperature heat storage flow path 12a and the second low temperature heat storage flow path 12b are connected to each other, and a second three way valve 72 is installed at the portion. One end of each of the second low temperature heat dissipation flow paths 52 and 53 is connected to the third low temperature heat storage flow path 12c to bypass the third low temperature heat storage flow path 12c, and a third three way valve 73 and the fourth three way valve 74 are installed at a portion in which the low temperature heat dissipation flow path 52 is connected to the third low temperature heat storage flow path 12c and a portion in which the low temperature heat dissipation flow path 53 is connected to the third low temperature heat storage flow path 12c, respectively. A heat dissipation pump 54 is installed on the second low temperature heat dissipation flow path 53 and pumps the low temperature molten salt in a direction toward the single thermal energy storage tank 20.

The heat exchanger 40 includes a preheater 41 that heat-exchanges a circulation fluid discharged from the power generator 30 with the molten salt and preheats the heat-exchanged circulation fluid and molten salt, a steam generator 42 that heat-exchanges the circulation fluid preheated by the preheater 41 with the molten salt again and generates steam, and a steam superheater 43 that heat-exchanges the steam generated by the steam generator 42 with the molten salt on the high temperature heat dissipation flow path 51 and heats the steam. The high temperature heat dissipation flow path 51 is configured to sequentially pass through the steam superheater 43, the steam generator 42, and the preheater 41.

The power generator 30 includes a steam turbine 31 and a motor 32. The steam turbine 31 is connected to a condenser 60 that condenses the circulation fluid discharged from the steam turbine 31. The condenser 60 is connected to a cooling tower 62 on a cooling flow path 63.

The steam turbine 31, the condenser 60, the preheater 41, the steam generator 42, and the steam superheater 43 are connected to first and second circulation flow paths 33 and 34. The first circulation flow path 33 is configured in such a way that the steam heated by the steam superheater 43 is guided toward the steam turbine 31. A power generation pump 35 is installed on the second circulation flow path 34 and pumps the circulation fluid.

An operation of the solar thermal power generation system having the above configuration according to the embodiment of the present invention will be described below.

Figure 2:
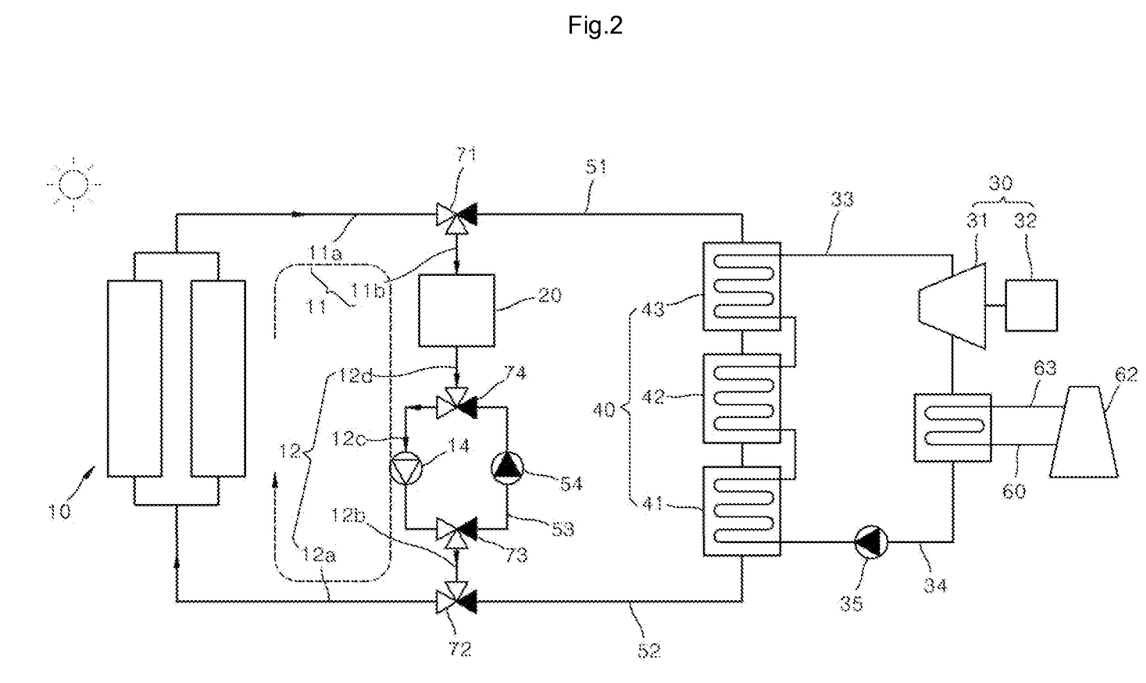
FIG. 2 is a view of an operation state in which a single thermal energy storage tank illustrated in FIG. 1 stores heat.

First, when heat is stored in the single thermal energy storage tank 20, referring to FIG. 2, the high temperature molten salt heated in the solar collector 10 is introduced into the single thermal energy storage tank 20 on the high temperature heat storage flow path 11. In this case, the first three way valve 71 opens the first and second high temperature heat storage flow paths 11a and 11b and closes the high temperature heat dissipation flow path 51 so that the high temperature molten salt heated in the solar collector 10 can be introduced only into the single thermal energy storage tank 20.

The molten salt introduced into the single thermal energy storage tank 20 passes through the plurality of flow holes 25a in the vertical direction. In this case, heat of the molten salt is stored in the single thermal energy storage tank 20. The upper portion of the single thermal energy storage tank 20 is in a high temperature state, and the lower portion of the single thermal energy storage tank 20 is in a low temperature state such that heat is formed as a layer and stored in the single thermal energy storage tank 20. The single thermal energy storage tank 20 includes a porous block formed of a material, such as alumina, SiC, or concrete having an excellent thermal energy storage capability and thus can store thermal energy while the molten salt passes through the porous block. Thus, the single thermal energy storage tank 20 need not to additionally include a high temperature tank and a low temperature tank so that costs can be reduced and the single thermal energy storage tank 20 can be made compact.

The molten salt discharged after heat is stored in the single thermal energy storage tank 20, is introduced into the solar collector 10 on the low temperature heat storage flow path 12.

Figure 3:
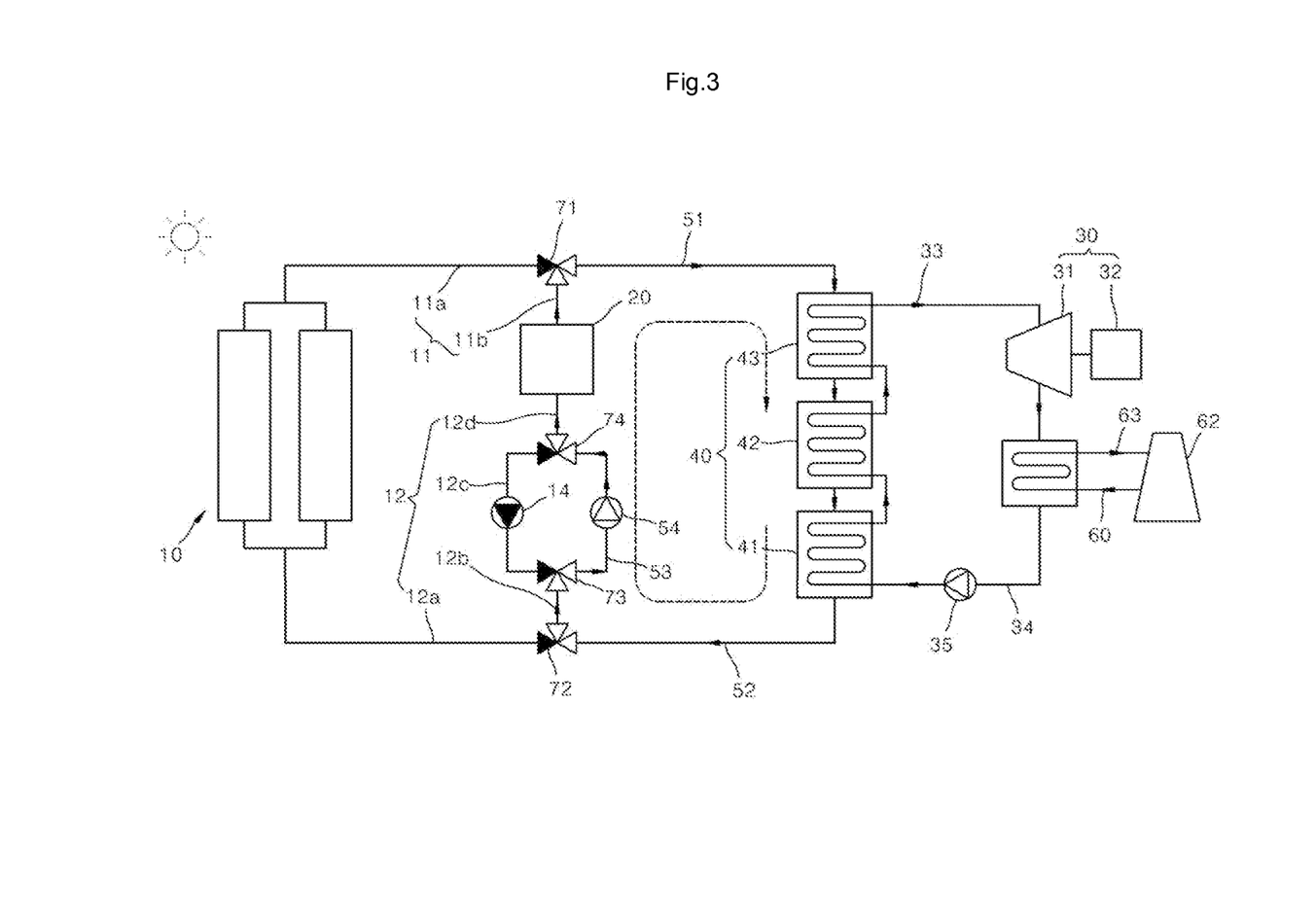
FIG. 3 is a view of an operation state in which the single thermal energy storage tank illustrated in FIG. 1 dissipates heat.
Figure 4:
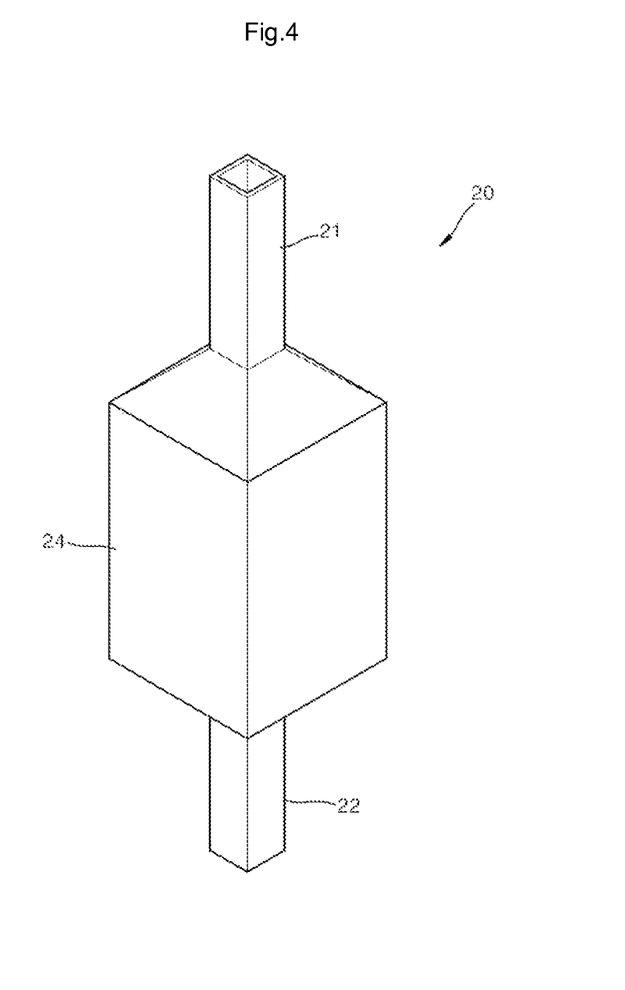
FIG. 4 is a perspective view of the single thermal energy storage tank of FIG. 1.

Meanwhile, referring to FIG. 3, the heat dissipation pump 54 operates to dissipate heat stored in the single thermal energy storage tank 20 and to generate power.

The first three way valve 71 closes the first high temperature heat storage flow path 11a and opens the high temperature heat dissipation flow path 51.

The high temperature molten salt discharged after absorbing heat of the single thermal energy storage tank 20, is guided toward the heat exchanger 40 on the high temperature heat dissipation flow path 51. That is, the high temperature molten salt guided on the high temperature heat dissipation flow path 51 supplies heat to the circulation fluid supplied to the steam turbine 31 by sequentially passing through the steam superheater 43, the steam generator 42, and the preheater 41.

The circulation fluid that is heat-exchanged by the heat exchanger 40 and receives heat, is supplied to the steam turbine 31 and generates electricity.

The molten salt that dissipates heat by sequentially passing the steam superheater 43, the steam generator 42, and the preheater 41, is supplied to the single thermal energy storage tank 20 again. In this case, the second three way valve 72 closes the first low temperature heat storage flow path 12a and opens the first low temperature heat dissipation flow path 52. Also, the third three way valve 73 and the fourth three way valve 74 close the third low temperature heat storage flow path 12c and open the second low temperature heat storage flow path 52. Thus, the molten salt that sequentially passes through the steam generator 42 and the preheater 41 is circulated throughout the single thermal energy storage tank 20 on the first low temperature heat dissipation flow path 52 and the second low temperature heat dissipation flow path 53.

As described above, only one single thermal energy storage tank 20 is used so that tank costs can be reduced and an installation space can also be reduced compared to a case where the high temperature tank and the low temperature tank are provided.

In addition, since the single thermal energy storage tank 20 includes the porous block, passage of the molten salt can be more easily performed compared to a case of an existing tank that stores heat by filling a filler with gravel, so that flow pressure drop can be reduced.

In addition, since the plurality of unit blocks can be stacked and combined with each other, the capacity of the single thermal energy storage tank 20 can be easily adjusted.

Figure 10:
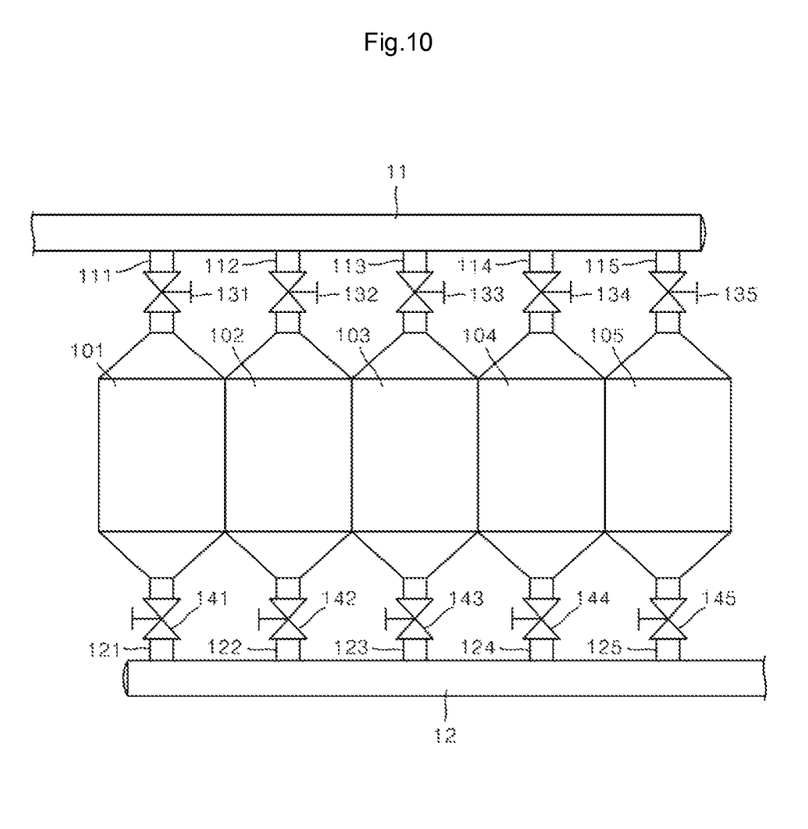
FIG. 10 is a view of connection of single thermal energy storage tanks according to another embodiment of the present invention.

Referring to FIG. 10, another embodiment of the present invention is different from the above embodiment in that a plurality of single thermal energy storage tanks are connected to the solar collector 10 in parallel, and the difference will be described in detail.

Here, first through fifth single thermal energy storage tanks 101, 102, 103, 104, and 105 are connected to the solar collector 10 in parallel. Each of the first through fifth single thermal energy storage tanks 101, 102, 103, 104, and 105 includes a porous block.

The high temperature heat storage flow path 11 is divided into first through fifth parallel high temperature heat storage flow paths 111, 112, 113, 114, and 115, and the first through fifth parallel high temperature heat storage flow paths 111, 112, 113, 114, and 115 are connected to upper portions of the first through fifth single thermal energy storage tanks 101, 102, 103, 104, and 105.

First through fifth inlet opening/closing valves 131, 132, 133, 134, and 135 are installed on the first through fifth parallel high temperature heat storage flow paths 111, 112, 113, 114, and 115 so as to open/close flow paths according to an operation load in such a way that the molten salt that passes through the high temperature heat storage flow path 11 can be supplied into only at least a part of the first through fifth single thermal energy storage tanks 101, 102, 103, 104, and 105.

The low temperature heat storage flow path 12 is divided into first through fifth parallel low temperature heat storage flow paths 121, 122, 123, 124, and 125, and the first through fifth parallel low temperature heat storage flow paths 121, 122, 123, 124, and 125 are connected to lower portions of the first through fifth single thermal energy storage tanks 101, 102, 103, 104, and 105.

First through fifth outlet opening/closing valves 141, 142, 143, 144, and 145 are installed on the first through fifth parallel low temperature heat storage flow paths 121, 122, 123, 124, and 125.

Thus, when a flow rate of the molten salt is small, heat can be stored using only a part of the first through fifth single thermal energy storage tanks 101, 102, 103, 104, and 105 according to the operation load.

As described above, when N single thermal energy storage tanks are connected to one another in parallel and used, a length of each of the N single thermal energy storage tanks is manufactured to be the same as a length obtained by dividing the length of an existing thermal energy storage tank by N. Since the length of the single thermal energy storage tank is reduced, the single thermal energy storage tank is manufactured to have a smaller size than that of the existing thermal energy storage tank so that manufacturing costs can be reduced. That is, even though a plurality of single thermal energy storage tanks are installed, each of the plurality of single thermal energy storage tanks is small so that the installation space can be easily acquired and an increase in costs can be eliminated.

In the small single thermal energy storage tank described above, a length of passage of the molten salt is reduced so that a time at which thermal energy is stored, can be further reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a solar thermal power generation system using a single hot molten salt thermal energy storage tank in which a thermal energy storage capability and liquidity of molten salt can be further improved, can be manufactured.

The invention claimed is:

1. A solar thermal power generation system using a single hot molten salt thermal energy storage tank, the solar thermal power generation system comprising:
   a solar collector that collects solar heat and heats molten salt;
   a single thermal energy storage tank that is formed in a shape of a porous block having a plurality of flow holes such that the molten salt heated from the solar collector passes through the plurality of flow holes and the molten salt is stored in the porous block of the single thermal energy storage tank; and
   a power generator that generates electricity by a steam generated from a circulation fluid by heat of the molten salt stored in the single thermal energy storage tank.

2. The solar thermal power generation system of claim 1, wherein the single thermal energy storage tank includes one porous block formed by stacking a plurality of unit blocks in a horizontal or vertical direction.

3. The solar thermal power generation system of claim 2, wherein the plurality of flow holes through which the molten salt passes the unit block, are formed in each of the plurality of unit blocks to be long in a flow direction, and the plurality of flow holes of each unit block are stacked in the vertical direction to communicate with each other.

4. The solar thermal power generation system of claim 1, wherein the single thermal energy storage tank includes the plurality of flow holes that are formed to be long in a flow direction so that the molten salt passes through the unit block through the plurality of flow holes and that are spaced apart from each other by a predetermined distance.

5. The solar thermal power generation system of claim 1, wherein the single thermal energy storage tank is formed of alumina.

6. The solar thermal power generation system of claim 1, further comprising:
a high temperature heat storage flow path on which high temperature molten salt heated in the solar collector is guided toward the single thermal energy storage tank; and
a low temperature heat storage flow path on which low temperature molten salt discharged after heat is stored in the single thermal energy storage tank, is guided toward the solar collector.

7. The solar thermal power generation system of claim 6, further comprising a heat-exchanging portion that absorbs heat stored in the single thermal energy storage tank and transfers the absorbed heat to the power generator,
wherein the heat-exchanging portion comprises:
a heat dissipation flow path which is connected to the high temperature heat storage flow path and on which heat stored in the single thermal energy storage tank is absorbed and dissipated; and
a heat exchanger that heat-exchanges the molten salt on the heat dissipation flow path with circulation fluid discharged from the power generator to generate the steam from the circulation fluid.

8. The solar thermal power generation system of claim 7, wherein the heat dissipation flow path comprises:
a high temperature heat dissipation flow path which is diverged from the high temperature heat storage flow path and on which the high temperature molten salt discharged in the single thermal energy storage tank, is guided toward the heat exchanger; and
a low temperature heat dissipation flow path which is connected to the low temperature heat storage flow path to bypass the low temperature heat storage flow path and on which the molten salt discharged after heat of the molten salt is dissipated from the heat exchanger, is guided toward the single thermal energy storage tank, and
a three way valve is installed at a portion in which the low temperature heat storage flow path and the low temperature heat dissipation flow path are connected to each other.

9. The solar thermal power generation system of claim 1, further comprising a heat exchanger which receives the molten salt from the single thermal energy storage tank and heat-exchanges the received molten salt with the circulation fluid discharged from the power generator to generate the steam, wherein the heat exchanger comprises:

a preheater that heat-exchanges the circulation fluid discharged from the power generator with the received molten salt and preheats the discharged circulation fluid;
a steam generator that heat-exchanges the circulation fluid that passes through the preheater with the received molten salt and generates the steam; and
a steam superheater that heat-exchanges the steam that passes through the steam generator with the received molten salt and superheats the steam,
wherein the received molten salt returns to the single thermal energy storage tank after passing through the steam superheater, the steam generator, and the preheater in series.

10. The solar thermal power generation system of claim 1, wherein a plurality of single thermal energy storage tanks are connected to the solar collector in parallel, and
at least a part of the plurality of single thermal energy storage tanks is selectively used according to an operation load.

11. The solar thermal power generation system of claim 10, further comprising:
a high temperature heat storage flow path on which high temperature molten salt heated in the solar collector is guided toward the single thermal energy storage tank;
a plurality of parallel heat storage flow paths which are diverged from the high temperature heat storage flow path and to which the plurality of single thermal energy storage tanks are respectively connected;
a plurality of opening/closing valves that are respectively disposed on the plurality of parallel heat storage flow paths and open/close flow paths according to an operation load so that the molten salt that passes through the high temperature heat storage flow path is supplied only to at least a part of the plurality of single thermal energy storage tanks; and
a low temperature heat storage flow path on which low temperature molten salt discharged after heat is stored in the single thermal energy storage tank, is guided toward the solar collector.

12. The solar thermal power generation system of claim 1, wherein the power generator includes a steam turbine, and the solar thermal power generation system further comprises:
a condenser that condenses the circulation fluid discharged from the steam turbine; and
a cooling tower that cools the condenser.

13. A solar thermal power generation system using a single hot molten salt thermal energy storage tank, the solar thermal power generation system comprising:
a solar collector that collects solar heat and heats molten salt;
a single thermal energy storage tank in which a plurality of unit blocks having a plurality of flow holes are stacked and combined such that the molten salt heated from the solar collector passes through the plurality of flow holes and the molten salt is stored in the plurality of unit blocks of the single thermal energy storage tank;
a power generator that generates electricity by a steam generated from a circulation fluid by heat of the molten salt stored in the single thermal energy storage tank;
a high temperature heat storage flow path on which high temperature molten salt heated in the solar collector is guided toward the single thermal energy storage tank;

a low temperature heat storage flow path on which low temperature molten salt discharged after heat is stored in the single thermal energy storage tank, is guided toward the solar collector;

a heat dissipation flow path which is diverged from the high temperature heat storage flow path and on which heat stored in the single thermal energy storage tank is absorbed and dissipated; and a heat exchanger that heat-exchanges the molten salt on the heat dissipation flow path with the circulation fluid discharged from the power generator to generate the steam from the circulation fluid.

14. The solar thermal power generation system of claim 13, wherein the heat exchanger comprises:

a preheater that heat-exchanges the circulation fluid discharged from the power generator with the molten salt on the heat dissipation flow path and preheats the circulation fluid discharged from the power generator;

a steam generator that heat-exchanges the circulation fluid that passes through the preheater with the molten salt on the heat dissipation flow path and generates the steam; and a steam superheater that heat-exchanges the steam that passes through the steam generator with the molten salt on the heat dissipation flow path and superheats the steam, wherein the molten salt is discharged from and returns to the single thermal energy storage tank through the dissipation flow path after passing through the steam superheater, the steam generator, and the preheater in series.

* * * * *